No. 874,478.
PATENTED DEC. 24, 1907.
T. E. ADAMS.
CATTLE POKE.
APPLICATION FILED AUG. 13, 1906.
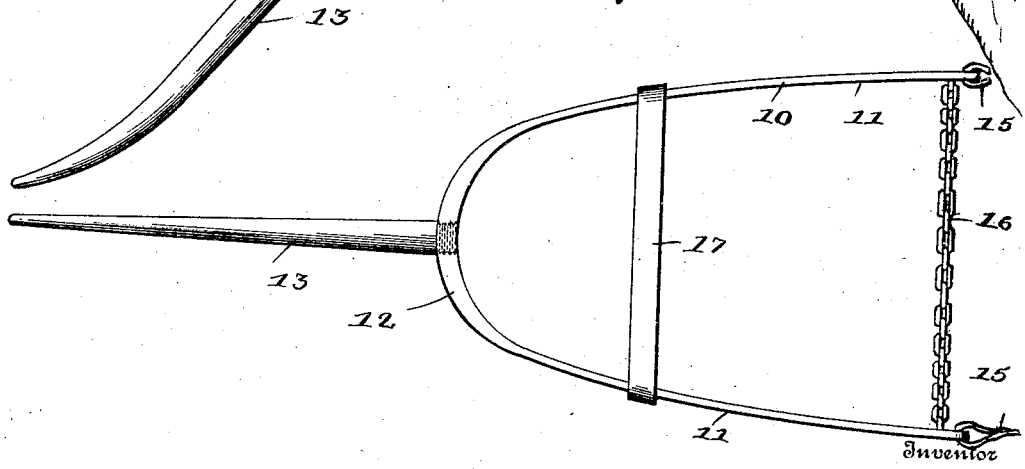
Witnesses
W. S. Rockwell
F. B. Mackal
Inventor
T. E. Adams
By
Attorneys

UNITED STATES PATENT OFFICE.

THOMAS E. ADAMS, OF DARLINGTON, LOUISIANA.

CATTLE-POKE.

No. 874,478.　　　　Specification of Letters Patent.　　　　Patented Dec. 24, 1907.

Application filed August 13, 1906. Serial No. 330,367.

*To all whom it may concern:*

Be it known that I, THOMAS E. ADAMS, a citizen of the United States, residing at Darlington, in the parish of St. Helena, State of Louisiana, have invented certain new and useful Improvements in Cattle-Pokes; and I do hereby declare the following to be a full, clear, and exact description of the invention, such as will enable others skilled in the art to which it appertains to make and use the same.

This invention has relation to animal pokes in which a relatively long rod or bar projects forward from a part of the head-stall so that should the animal attempt to jump a fence or commit similar mischief, the poke will be operated to inflict pain or distress on the animal's head and so cause it to desist in its undertaking.

It is the purpose of the invention to provide improvements that will render it more efficient and that will allow the animal to freely crop grass or graze at will.

The invention is fully and clearly shown in the annexed drawings, in connection with which it will be described in detail and then pointed out with particularity and succinctness in the subjoined claim.

Of the said drawings, Figure 1 is a perspective view of the invention, showing it in position on an animal's head. Fig. 2 is a plan of the device detached.

Similar numerals of reference designate the same parts or features wherever they occur.

In the drawings, 10 designates an approximately U-shaped yoke composed of metal, the side straps 11 of which extend along the cheeks of the animal on opposide sides, and the bow part 12 of said yoke extends around the nose, with a poke 13 consisting of a spring rod or bar projecting forward from the bow part to which it is detachably secured in any convenient way, as, for instance, screwing it into the bow. The poke is turned upward at its forward end as is usual in devices for a like purpose to the present invention.

The ends of the cheek straps are provided with holes or eyelets 14, to which the ends of the head strap 15, that passes over the animal's head behind the ears, are fastened, as shown.

16 designates a jaw-curb consisting of a chain which passes the rear portion of the under jaw and has its ends fastened in the eyelets 14, at the ends of the cheek straps 11.

17 designates a strap that goes over the animal's nose and has its ends secured to the cheek straps. The device is left free of any strap or thing below the cheek straps so that the animal can freely open its jaws when out of mischief and desiring to crop grass or pasture, the poke sliding on the ground in front.

In case the animal should attempt to jump a fence or commit like mischief, the poke will catch upon the fence turning the animal's head downward, and at the same time will rock the nose yoke on the nose-strap 17, raising the curb-chain 16 against the rear of the under jaw and inflicting such pain through the said curb-chain as will cause the animal to desist in its purpose.

I attach importance to the arrangement of the curb-chain under the lower jaw at the rear of the same and to leaving the lower jaw, forward of the curb-chain free, since there need be but a slight pull upward on the curb-chain as arranged to stop the animal in its intended mischief, and no permanent harm can be inflicted by said curb, and furthermore the freedom of the lower jaw below the cheek straps allows the animal to feed, as stated. Moreover, the arrangement of the curb-chain as specified obviates all liability of the head-strap 15 being stripped or pulled off over the ears and head of the animal when the forward end of the poke is depressed.

What is claimed as the invention, is:—

An animal poke comprising in its construction a metallic yoke, substantially U-shaped, the bend being adapted to extend around the end of the animal's nose and the arms to extend as side-straps along the cheeks on both sides of the animal's head, the end portions of said side straps being provided with holes, a head strap having its ends secured in said holes, a curb-chain also connected at its ends in said holes of the cheek straps, and adapted to pass under the rear portion of the under jaw, a strap adapted to be passed over the nose of the animal and secured at its ends to the said side straps, and a poke projecting forward from the nose end of the yoke, whereby the lower jaw of the animal forward of the curb-chain may be free of any obstruction or device, and whereby also by the depression of the forward end of the poke the curb-chain will be operated to inflict a degree of punishment on the animal.

In testimony whereof, I affix my signature, in presence of two witnesses.

THOMAS E. ADAMS.

Witnesses:
W. C. FLOYD,
CLYDE S. HOLLAND.